United States Patent
Rollins et al.

(10) Patent No.: US 9,906,482 B2
(45) Date of Patent: Feb. 27, 2018

(54) PREDICTIVE ELECTRONIC MESSAGE MANAGEMENT SYSTEMS AND CONTROLLERS

(71) Applicant: The Travelers Indemnity Company, Hartford, CT (US)

(72) Inventors: David Rollins, West Hartford, CT (US); Faith E. Doub, West Hartford, CT (US); Catherine A. Leek, Mansfield Center, CT (US)

(73) Assignee: The Travelers Indemnity Company, Hartford, CT (US)

( * ) Notice: Subject to any disclaimer, the term of this patent is extended or adjusted under 35 U.S.C. 154(b) by 376 days.

(21) Appl. No.: 14/815,528

(22) Filed: Jul. 31, 2015

(65) Prior Publication Data

US 2016/0337301 A1    Nov. 17, 2016

Related U.S. Application Data

(60) Provisional application No. 62/161,222, filed on May 13, 2015.

(51) Int. Cl.
 *G06F 15/16* (2006.01)
 *H04L 12/58* (2006.01)

(52) U.S. Cl.
 CPC .............. *H04L 51/26* (2013.01); *H04L 51/02* (2013.01)

(58) Field of Classification Search
 CPC ................................ H04L 51/26; H04L 51/02
 USPC .......................................... 709/204, 206, 224
 See application file for complete search history.

(56) References Cited

U.S. PATENT DOCUMENTS

| | | | |
|---|---|---|---|
| 5,513,126 A | 4/1996 | Harkins et al. | |
| 7,949,574 B2* | 5/2011 | Patel | G06Q 20/108 235/375 |
| 8,954,503 B2 | 2/2015 | Bosworth et al. | |
| 2008/0301175 A1* | 12/2008 | Applebaum | G06F 17/3051 |
| 2010/0158239 A1* | 6/2010 | Anisimov | H04M 3/51 379/266.07 |
| 2010/0165977 A1* | 7/2010 | McCord | H04L 12/66 370/352 |
| 2012/0078813 A1* | 3/2012 | Rose | G06Q 40/00 705/36 R |
| 2013/0191185 A1* | 7/2013 | Galvin | G06Q 10/10 705/7.37 |
| 2014/0059141 A1* | 2/2014 | Belkin | H04L 51/12 709/206 |
| 2014/0172740 A1 | 6/2014 | McCormick et al. | |

OTHER PUBLICATIONS

Customer Connections in Real Time (http://marketing.teradata.com/US/Solutions/Campaign-Management/Real-Time-Interaction-Manager/) download date: Oct. 6, 2014; 4 pps.

* cited by examiner

*Primary Examiner* — Philip B Tran
(74) *Attorney, Agent, or Firm* — Michael D. Downs; Fincham Downs LLC

(57) ABSTRACT

Systems, methods, and articles of manufacture provide for interaction management (IM) data processing that allows for automated analysis of, response to, and/or identification of patterns in electronic messages (e.g., emails, text messages), via specially-programmed data processing modules configured to be executed in a communications system environment.

12 Claims, 6 Drawing Sheets

PREDICTIVE ELECTRONIC MESSAGE MANAGEMENT SYSTEMS AND CONTROLLERS

CROSS-REFERENCE TO RELATED APPLICATIONS

The present application claims the benefit of priority of U.S. Provisional Patent Application No. 62/161,222 filed May 13, 2015, entitled "PREDICTIVE ELECTRONIC MESSAGE MANAGEMENT SYSTEMS AND CONTROLLERS," which is incorporated by reference in the present application.

BACKGROUND

Some types of processes and systems for automatically reviewing and responding to electronic messages (e.g., email, text messages, etc.) based on static rules (e.g., based on message content) are known. However, such systems have failed to recognize the importance of reviewing a plurality or sequence of past and/or current communications, and adapting responses to communications based on previous message-based exchanges and/or based on previous transactions with a particular user (or with a similar user).

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

Embodiments presented herein are descriptive of electronic message processing systems, controllers, apparatus, methods, and articles of manufacture for providing interaction management (IM).

The inventors have recognized that currently available processes and systems for managing and responding to communications do not allow for active and intelligent management of the interactions occurring among users within an enterprise, or between internal users and users external to an organization or enterprise (e.g., between customer service personnel and a business's customers). While such systems may provide some technical benefit in improving the efficiency with which individual communications may be processed and responded to automatically by email servers, for instance, they fail to address adequately such technical problems. A rigid rule for a generic auto-reply to a customer's email, for example, may result in additional, unnecessary, and inefficient electronic communications, and a corresponding drain on the often overtaxed resources available in a communication system. In contrast, the inventors have described in this disclosure various solutions to this technical failing. Various types of electronic message processing systems and methods are provided that can more efficiently receive and process electronic communications, including, but not limited to, providing outgoing or response messages and/or directing or scheduling next actions to be taken. Some embodiments provide for identifying patterns of interactions between and among users over time, considering the context of different types of transactions about which users may be communicating, and/or by assessing historical outcomes of such transactions and/or patterns of interactions. Accordingly, described herein are systems and processes that manage electronic communications (and other interaction events) and related communications systems in manners that avoid or minimize wasted and excessive electronic messaging, using technical improvements to electronic message handling not previously contemplated.

Figure 1:
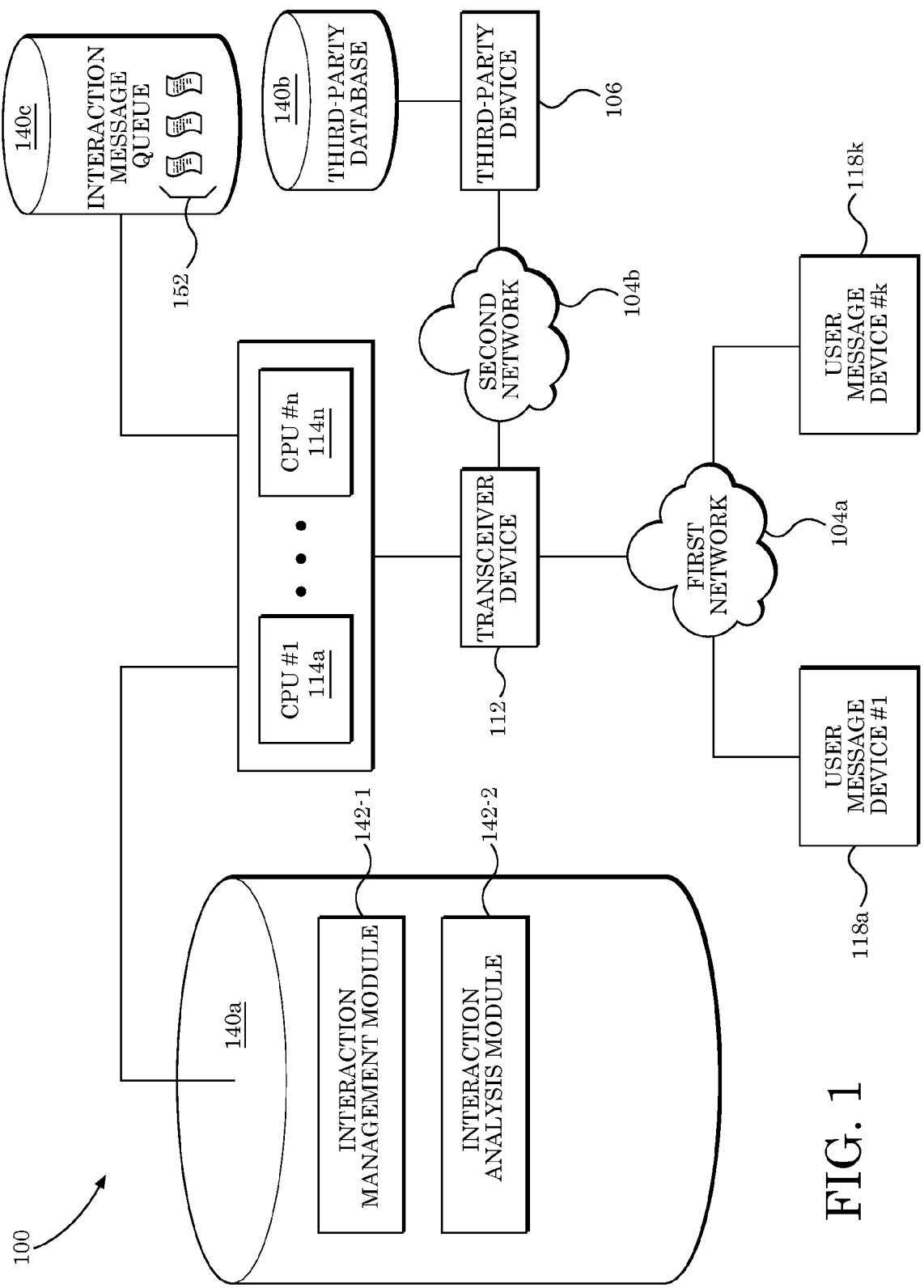
FIG. 1 is a block diagram of a system according to some embodiments.

Turning first to FIG. 1, a block diagram of a system 100 (e.g., an interaction management system) according to some embodiments is shown. In some embodiments, the system 100 may comprise one or more remote user message devices 118a-k, one or more networks 104a-b, a third-party device 106, a transceiver device 112, a plurality of processing devices (e.g., depicted as central processing unit (CPU) devices) 114a-n, one or more user devices 118a-k, and/or one or more databases 140a-c (e.g., storing various instructions, such as an interaction management module 142-1 and an interaction analysis module 142-2).

In some embodiments, the system 100 may be configured to receive, process, analyze, and/or respond to at least one electronic message in an interaction message queue 152, which may include one or more of various types of electronic messages, including but not limited to emails, text messages, voicemails, and/or voice input to an interactive voice response unit (IVRU). According to some embodiments, the interaction message queue 152 may be populated by messages received (e.g., via one or more of networks 104a-b, and/or one or more other networks (not shown)) by the transceiver 112 and stored in the interaction message queue 152 for processing in accordance with one or more of the interaction management module 142-1 and interaction analysis module 142-2. Interaction message queue 152 may include, for example, messages received by interaction management system 100 and queued (e.g., in the order received) for processing, including, in some embodiments, an automated response based on one or more related messages (e.g., previous messages of the same conversation or communication thread). The system 100 may, for example, be specially programmed, as described in this disclosure, to review, parse, store, respond to, analyze, score, and/or transmit interaction messages from interaction message queue 152, in an efficient manner configured to optimize the use of resources of a network communication system.

Various types of interaction messages are contemplated in this disclosure. Messages may be simple reporting or notification communications that do not require or expect a response (e.g., a status update, a weather alert). In another example, an interaction message may comprise a request for information and/or a request for an action to be taken (e.g., a question about a user's account, a request to set up a meeting), and may be followed by a responsive interaction outgoing message (e.g., an answer to the user's question, a confirmation that a meeting has been set). Some other examples of interaction messages include, without limitation:

a request for businesses or individuals in a certain location (e.g., insurance agents in a particular ZIP Code), a request for business documentation (e.g., a proof of insurance), a request for a phone call with a company representative, and/or a request for an expert in or assistance with a particular subject.

In another example, a customer may request information about ice dams. The interaction management system may use natural language interpretation, for example, to understand that the customer is interested in learning about ice dams. On processing the interaction message, the IM system may return to the customer, or route the customer to, an existing web page containing the requested information about ice dam prevention. In another example, an on-site consultant doing an on-site risk survey of a facility sends a request for the help of a sprinkler expert, in order to assess the adequacy of a particular sprinkler system. The IM system, after recognizing the request based on keywords, routes the request to an internal web service that queries a certification database to identify an expert on call. The IM system may further initiate an interaction between the consultant and the identified expert.

Fewer or more of the components depicted in FIG. 1 (and/or portions thereof) and/or various configurations of the components may be included in the system 100 without deviating from the scope of embodiments described in this disclosure. While multiple instances of some components are depicted and single instances of other components are depicted, for example, any component depicted in the system 100 may comprise a single device, a combination of devices and/or components, and/or a plurality of devices, as is or becomes desirable and/or practicable for a particular implementation. Similarly, in some embodiments, one or more of the various components may not be needed and/or desired in the system 100. According to some embodiments, the system 100 may be configured to implement, conduct, and/or facilitate the execution of various data processing procedures, such as the interaction management processing procedures described in accordance with the example methods of this disclosure (or portions and/or combinations of such methods).

As used herein, a "user message device" is a subset of a "user device" (defined below) and specifically comprises one or more components facilitating electronic communication of messages with one or more other computing devices. A user message device, while a user device associated with a particular user or users, may facilitate the generation and/or transmission of messages by one or more users (e.g., by a user entering and sending an email message using a smartphone) and/or by the user message device itself (e.g., an auto-generated message from a tablet computer or other network device associated with a user). Further, a user message device may receive messages generated and/or transmitted by one or more users and/or by one or more other types of network devices (e.g., an interaction management server).

According to some embodiments, the user message devices 118a-k may comprise any types or configurations of computing, mobile electronic, telephone, network, user, and/or communication devices practicable for providing and/or receiving electronic messages. The user message devices 118a-k may, for example, comprise one or more personal computer (PC) devices, computer workstations (e.g., claim adjuster and/or handler workstations), tablet computers such as an iPad® manufactured by Apple®, Inc. of Cupertino, Calif., and/or cellular and/or wireless telephones such as an iPhone® (also manufactured by Apple®, Inc.) or an Optimus™ F7 smart phone manufactured by LG® Electronics, Inc. of San Diego, Calif., and running the Android® operating system from Google®, Inc. of Mountain View, Calif. In some embodiments, the user message devices 118a-k may comprise devices owned and/or operated by one or more remote users such as customers, agents (e.g., insurance agents), employees of a business, and/or other users (e.g., claims handlers for an insurance company).

In some embodiments, one or more of the user message devices 118a-k are in electronic communication with (and/or electronically and/or communicatively coupled to) a first network 104a. The first network 104a may, for example, electronically and/or communicatively connect one or more of the user message devices 118a-k with the transceiver device 112. In some embodiments, the user message devices 118a-k may provide messages and/or other types of data via the first network 104a and to the transceiver device 112.

According to some embodiments, the networks 104a-b may comprise one or more local area networks (LAN; wireless and/or wired), cellular telephone, Bluetooth®, near field communication (NFC), and/or radio frequency (RF) networks with communication links between any or all of the user message devices 118a-k, the third-party device 106, and/or the transceiver device 112. In some embodiments, the networks 104a-b may comprise direct communications links between any or all of the components of the system 100. The user message devices 118a-k may, for example, be directly interfaced or connected to transceiver device 112 via one or more wires, cables, wireless links, and/or other network components, such network components (e.g., communication links) comprising portions of the first network 104a. In some embodiments, the networks 104a-b may comprise one or many other links or network components other than those depicted in FIG. 1. The user message devices 118a-k may, for example, be connected to the transceiver device 112 via various cell towers, routers, repeaters, ports, switches, and/or other network components that comprise the Internet and/or a cellular telephone (and/or public switched telephone network (PSTN)) network.

While the networks 104a-b are depicted in FIG. 1 as a single and/or separate objects, the networks 104a-b may comprise any number, type, and/or configuration of networks that are or become known or practicable. According to some embodiments, the networks 104a-b may comprise a conglomeration of different sub-networks and/or network components interconnected, directly or indirectly, by the components of the system 100. The networks 104a-b may comprise one or more cellular telephone networks with communication links between the user message devices 118a-k and the transceiver device 112, for example, and/or may comprise the Internet, with communication links between the transceiver device 112 and the third-party device 106 and/or the databases 140a-c, for example.

In some embodiments, a second network 104b may electronically and/or communicatively connect the transceiver device 112 to the third-party device 106. The third-party device 106 may, for example, be in electronic communication with (and/or electronically and/or communicatively coupled to) the second network 104b. In some embodiments, the third-party device may provide data to the transceiver device 112. The third-party device 106 may, for example, access data stored in a third-party database 140b and provide the data to the transceiver device 112 (e.g., upon request and/or command, such as in response to a database query initiated and/or conducted via the transceiver device 112).

According to some embodiments, the third-party device 106 may comprise any type or configuration of a computerized processing device such as a PC, laptop computer, computer server, database system, and/or other electronic device, devices, or any combination thereof. In some embodiments, the third-party device 106 may be owned and/or operated by a third-party (i.e., an entity different than any entity owning and/or operating any of the user message devices 118a-k and/or or the transceiver device 112). The third-party device 106 may, for example, be owned and/or operated by a third-party message service provider (e.g., a message service provider utilizing the Twilio Platform™ communications platform and software). In some embodiments, the third-party device 106 may supply and/or provide data such as current or historic message data to the transceiver device 112. In some embodiments, the third-party device 106 may comprise a plurality of devices and/or may be associated with a plurality of third-party entities.

In some embodiments, the transceiver device 112 may receive data from either or both of the first network 104a and the second network 104b and provide the received (and/or retrieved) data to one or more of the processing devices 114a-n. The transceiver device 112 may, for example, act in command of or otherwise in response to one or more of the processing devices 114a-n to provide data acquired from the user message devices 118a-k and/or the third-party device 106, such as to facilitate and/or conduct processing of incoming and/or outgoing messages for interaction management.

According to some embodiments, the transceiver device 112 may comprise any type and/or configuration of bi-directional electronic communication device that is practicable for a desired implementation. The transceiver device 112 may comprise, for example, a printed circuit board (PCB) device configured with appropriate electronic pathways, traces, and/or circuitry components (such as capacitors, resistors, transducers, transistors, diodes, and/or inductive devices) for receiving and transmitting electronic information packets in accordance with one or more transmission protocols such as the Internet Protocol Version 6(IPv6) standard as defined by "Internet Protocol Version 6 (IPv6) Specification" RFC 1883, published by the Internet Engineering Task Force (IETF), Network Working Group, S. Deering et al. (December 1995).

In some embodiments, the processing devices 114a-n may receive and/or acquire data from the transceiver device 112 (e.g., directly and/or via one or more networks or network components not explicitly depicted in FIG. 1). One or more of the processing devices 114a-n may, for example, execute instructions, rules, and/or logic programmatically defined by one or more of the interaction management module 142-1 and/or the interaction analysis module 142-2 (each stored in a database 140a accessible to the processing devices 114a-n), such instructions (as described in detail in this disclosure) causing the transceiver device 112 to acquire and/or receive various data inputs (e.g., from the user message devices 118a-k, the interaction message queue 152, and/or the third-party device 106 (and/or the third-party database 140b)). In some embodiments, the processing devices 114a-n may comprise one or more multi-core CPU devices such as an Intel® Xeon® Processor E7-2890 v2 and/or one or more cores and/or processing threads thereof.

According to some embodiments, the processing devices 114a-n may analyze the acquired inputs in accordance with any or all of the stored instructions to determine (e.g., calculate) one or more interaction management metrics. The processing devices 114a-n may, for example, receive messages from interaction message queue 152, interaction message type data from the database 140a (and/or third-party data from the third-party device 106), user data from the user message devices 118a-k, and so on, and process some or all of such data in accordance with the instructions of interaction management module 142-1 and/or interaction analysis module 142-2 to determine metrics and/or predicted outcomes for individual interactions, for historical collections of interactions, and/or for generated interaction patterns.

According to some embodiments, an interaction management metric may comprise an interaction pattern metric that describes a relationship of one or more interaction messages (e.g., a received message from a user) to one or more interaction patterns (e.g., a predefined interaction pattern), such as one or more of: (i) an assessment of how closely a given interaction message may fit a given interaction pattern, and/or (ii) an assessment of a likely outcome of a transaction associated with one or more interaction messages (e.g., a predicted settlement amount for an insurance claim).

The inventors have recognized that, in accordance with some embodiments described in this disclosure, it may be beneficial: (i) to establish coefficients and other factors useful for assessing how closely a given interaction message may fit a given interaction pattern (e.g., for use in calculating an interaction pattern score); (ii) to assess a likelihood a given interaction will result in a particular outcome; (iii) to predict content of and/or an interaction type of a subsequent interaction message expected to be received from a user in response to a particular interaction outgoing message to the user (e.g., predicting the user's response to an outgoing email based on an established interaction pattern); and/or (iv) to provide for more efficient interaction management and utilization of electronic communication systems and resources, by recommending one or more actions (e.g., a reply to an email inquiry) based on an assessment of a likelihood of a related transaction (e.g., to reduce the likelihood of additional communications being required). Some embodiments described in this disclosure provide for the aggregation, analysis and preparation of data (e.g., historical interaction message and/or user data) for use in providing one or more of the beneficial functions described above.

In some embodiments, the processing devices 114a-n may provide one or more outputs indicative of the determined interaction management metric (e.g., via the transceiver device 112, the first network 104a, and/or the user message devices 118a-k). The output provided by the processing devices 114a-n may, for example, comprise a command and/or interaction outgoing message request that causes the user message devices 118a-k to receive a scheduled interaction event and/or an electronic interaction message in accordance with the interaction management metric.

According to some embodiments, an interaction management metric may comprise an indication that a business professional should intervene personally in what would have otherwise been an automated communication process. In one example, an email response may be transmitted stating that a business professional will follow up with a phone call to a customer, where a determined interaction management metric based on an analysis of similar previous interactions indicates that an automated email response alone would likely lead to an undesirable outcome for the transaction.

According to some embodiments, the databases 140a-c may comprise any type, configuration, and/or quantity of data storage devices that are or become known or practicable. The databases 140a-c may, for example, comprise an array of optical and/or solid-state hard drives configured to store policy, customer, weather, staffing, workload, and/or location data provided by (and/or requested by) the user message devices 118a-k and/or the third-party device 106, and/or various operating instructions, drivers, etc. While the databases 140a-c are depicted as a stand-alone and/or separate components of the system 100 in FIG. 1, the databases 140a-c may comprise multiple components. In some embodiments, a multi-component database 140a-c may be distributed across various devices and/or may comprise remotely dispersed components. Any or all of the user message devices 118a-k, the transceiver device 112, the processing devices 114a-n, and/or third-party device 106 may comprise the databases 140a-c or a portion thereof, for example.

Various types of communications formats, protocols, and networks are contemplated for use with one or more embodiments of an interaction management system. Electronic interaction messages may be embodied, for example and without limitation, as one or more of:

a voice message,
a short message service (SMS) message,
a multimedia message service (MMS) message,
a message received via a browser application,
a message received from a mobile device,
a message received via Internet from a user device,
an email message, and/or
an instant message (IM).

Any of the networks 104a-b may provide for one or more of the corresponding services configured to provide for one or more types of electronic messaging.

Figure 2A:
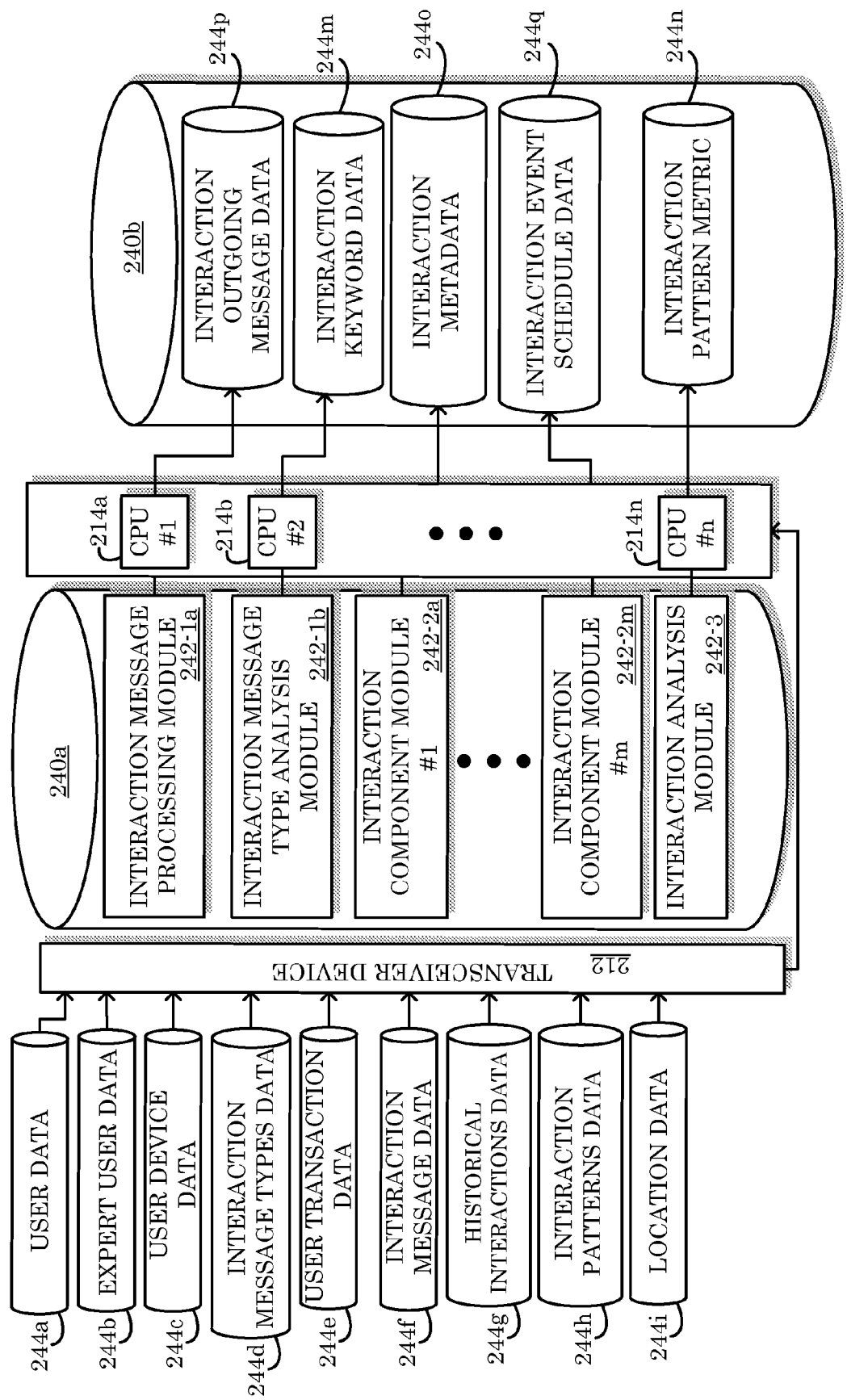
FIG. 2A and FIG. 2B are block diagrams of a system according to some embodiments.
Figure 2B:
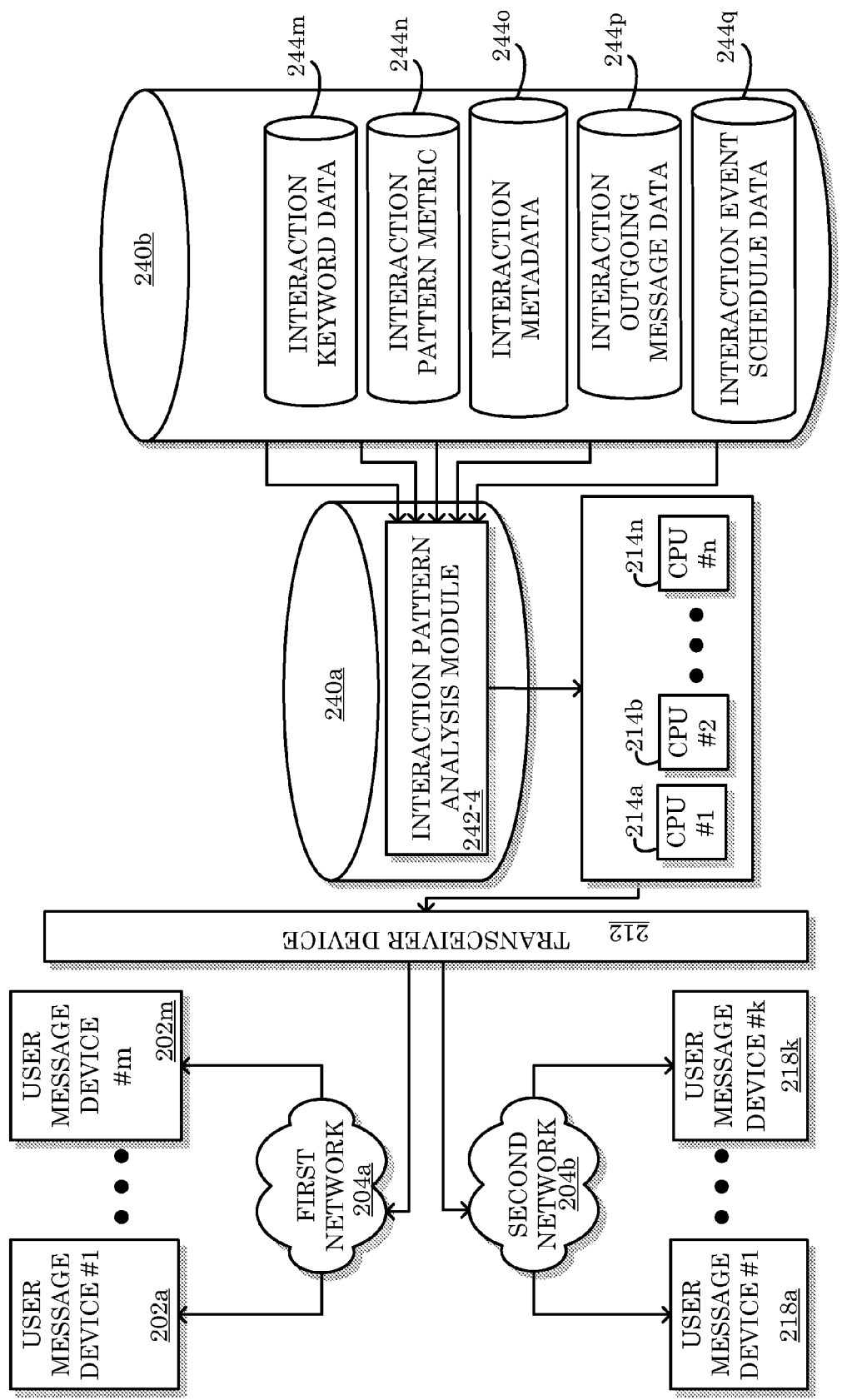

Turning to FIG. 2A and FIG. 2B, block diagrams of a system 200 according to some embodiments are shown. In some embodiments, the system 200 may comprise one or more user message devices 202a-m (e.g., "outside" message devices external to an enterprise or business), one or more networks 204a-b (e.g., a first "outside" network 204a and/or a second "inside" network 204b), a transceiver device 212, a plurality of processing devices (e.g., depicted as CPU devices) 214a-n, one or more user message devices 218a-k (e.g., "inside" message devices internal to an enterprise or business), and/or one or more databases 240a-b (such as a first database 240a and/or a second database 240b).

In some embodiments, the databases 240a-b may store various programs, stored instruction sets, and/or programmatic modules, such as an interaction message processing module 242-1a, an interaction message type analysis module 242-1b, one or more interaction component modules (e.g., a first interaction component module 242-2a and/or an $m^{th}$ interaction component module 242-2m), and/or an interaction analysis module 242-3.

According to some embodiments, various data elements and/or values thereof may be received by, determined by, utilized by, and/or calculated or derived by the system 200. Inputs to the system 200 may comprise, for example, user data 244a, expert user data 244b, user device data 244c, interaction message types data 244d, user transaction data 244e, interaction message data 244f, historical interactions data 244g, interaction patterns data 244h, and/or location data 244i. In some embodiments, outputs and/or variables derived and/or defined by the system 200 may comprise interaction keyword data 244m, interaction pattern metric 244n, interaction metadata 244o, interaction outgoing message data 244p, and/or interaction event schedule data 244q.

In some embodiments, any or all input data elements (e.g., data items 244a-i) may be received by the transceiver device 212 from one or more external and/or remote devices, such as the user message devices 202a-m and/or the user message devices 218a-k (and/or one or more other devices not shown in FIG. 2A or FIG. 2B). According to some embodiments, the transceiver 212 may direct and/or route various information packets representing (and/or descriptive of) the data items 244a-i to one or more of the processing devices 214a-n for use in executing one or more of the various individual instruction modules and/or specific combinations thereof (e.g., stored in the first database 240a).

The user data 244a, expert user data 244b, user device data 244c, user transaction data 244e, interaction message data 244f (e.g., embodied as and/or received from a stored queue of interaction messages), and/or location data 244i may, for example, be provided to and/or processed by the interaction message processing module 242-1a (e.g., as executed by, for example, a first processing device 214a). In some embodiments, interaction message processing module 242-1a may act as a controller or master module with respect to one or more other modules (including any of the modules depicted in FIG. 2A). In one example, the interaction message processing module 242-1a may pass interaction message data 244f (e.g., one or more electronic interaction messages) to interaction message type analysis module 242-1b for determining what type of interaction message a user has provided (or intended to provide).

In some embodiments, user data 244a and/or user device data 244c may comprise, for example, a telephone number or other identifier that identifies a user and/or a user's device. In one example using a telephone number, the provided phone number may be checked to see if it is correct (e.g., if it matches any user's account). Once a user is identified, information related to the user (e.g., a corresponding insurance policy, a customer order number, etc.) may be located (e.g., in user transaction data 244e).

Interaction message type analysis module 242-1b may receive (e.g., have passed to it by interaction message processing module 242-1a and/or transceiver device 212) interaction message types data 244d for use in comparing keywords (e.g., keywords associated with stored definitions of interaction message types) with the contents of interaction messages. In one embodiment, interaction message type analysis module 242-1b may comprise or cause to execute a natural language processor module for identifying, using a natural language processing algorithm (e.g., the Alchemy™ natural language processing API), one or more terms or other keywords in an interaction message. The module 242-1b may then compare any identified keywords with predefined keywords in the interaction message types data 244d to determine what type of interaction message a user has provided (e.g., an inquiry, a request for assistance, a request for a specific document or other information, a request for an expert or consultant on a particular subject, and so on). Once identified, any keywords found in interaction messages may be transmitted and/or stored (e.g., as interaction keyword data 244m). In one embodiment, an indication of one or more interaction message types found by interaction message type analysis module 242-1b to be good matches, based on the message content, for an electronic interaction message, may be passed to interaction message processing module 242-1a and/or to one of the interaction component modules for additional processing, and/or to database 240b for storage.

When an "unknown" interaction type is encountered (e.g., no sufficient match is identified based on the content of the interaction message) the interaction message type analysis module 242-1b may perform additional keyword analysis to approximate the intent of the request (e.g., derive an interaction type), and identify possible new interactions. In one embodiment, the system 200 may then transmit an outgoing message to confirm with the user that the derived interaction type is correct. If the user confirms that the interaction type chosen by the system 200 is correct, the selected keywords may be stored in association with the derived action/interaction type (e.g., in interaction message types data 244*d*) so that future similar requests can be automatically resolved.

In some embodiments, a predictive analysis tool or cognitive computing engine may also be employed to help automate how the system learns about unknown interactions in order to improve itself.

According to some embodiments, any of the data items 244*a-i* may be processed by the interaction analysis module 242-3 to derive one or more particular output metrics, such as the interaction pattern metric 244*n*. The interaction pattern metric 244*n* may, for example, be descriptive of a weight, score, rank, rating, and/or other qualitative and/or quantitative measure of an interaction pattern. In one example, the interaction pattern metric 244*n* may indicate a score representative of the likelihood that a current interaction will have a desired outcome (e.g., will reach a desired business outcome, such as completing a sales transaction, renewing a contract, or achieving a desired satisfaction score from a transaction). An interaction pattern metric 244*n* may be determined with respect to a single interaction (e.g., a single "conversation" or set of electronic communications) and/or with respect to more than one interaction.

According to some embodiments, determining an interaction pattern metric 244*n* may comprise initiating a scoring method. The scoring method, for example, may take any of the data items 244*a-i* as input, perform a transformation on the data items to create binary variables pertaining to ranges and values developed for an interaction pattern metric scoring model, apply factors to the transformed data, determine a score which is predictive of a particular outcome (e.g., an expected claim settlement amount) using a logistic regression method (e.g., proc logistic), and transmit and/or store an indication of the score. In one example, scores >=0.8 may be indicative of a higher likelihood of a particular outcome (e.g., a likelihood that a customer will find a particular interaction outgoing message sufficient to terminate an interaction to the customer's satisfaction) and scores below 0.3 may indicate a relatively lower likelihood of achieving the particular outcome (e.g., indicating a likelihood that the interaction will require additional exchanges of interaction messages). Of course, any number of gradations, tiers or ranges for indicating a likelihood of a particular outcome of a current interaction, and which may be deemed appropriate as an interaction pattern metric, may be provided for (e.g., "high," "medium," and "low"; "$0-$999," "$1,000-$9,999," and so on), with respective corresponding recommended actions, as desired for any particular implementation.

In some embodiments, the interaction message data 244*f* and one or more of the other types of data items indicated in FIG. 2A may be processed by the interaction message processing module 242-1*a* and/or one of the interaction component modules to determine, automatically, the content of an appropriate interaction outgoing message and/or at least one appropriate recipient for the outgoing message.

In some embodiments, the interaction message processing module 242-1*a* and/or one of the interaction component modules may determine at least one interaction event to schedule (e.g., as represented by interaction event schedule data 244*q*). In one example, an action, event, or appointment may be scheduled for the future, with respect to an interaction (e.g., follow up with a customer in one week by email) and/or with respect to a transaction related to the interaction. According to some embodiments, an interaction component module may comprise and/or be in communication with an interaction event scheduler, such as a messaging, appointment, and/or productivity application (e.g., the Outlook® productivity and messaging application and/or Exchange Server 2013™ productivity and messaging server application by Microsoft, Inc.). In one or more embodiments, the interaction event scheduler may be configured (e.g., with computer-readable software instructions) to receive and/or store interaction event schedule data 244*q*, and to automatically initiate scheduled interaction events when they are due (e.g., to automatically transmit a previously defined email message to a recipient at a scheduled time).

In some embodiments, one or more of the interaction message processing module 242-1*a*, interaction message type analysis module 242-1*b*, and/or an interaction component module may determine metadata associated with one or more interaction messages. In one example, information about a user who sent an interaction (e.g., user data 244*a*) and/or information defining a transaction and/or account of a user (e.g., user transaction data 244*e*) may be used to collect metadata associated with a particular interaction message, and which may be output and/or stored as interaction metadata 244*o*. In one example, interaction metadata 244*o* for an interaction message relevant to an insurance policy may include an insurance policy number, an insurance claim number, a premium amount, and/or a claim settlement amount.

According to some embodiments, any or all of the output data 244*m-q* (e.g., output metrics) may be stored in a second database 240*b*, as depicted. In some embodiments, upon execution of the instruction modules by one or more of (or two or more of, in some embodiments) the processing devices 214*a-n*, the second database 240*b* may be populated with data descriptive of and/or defining the output data 244*m-q*. FIG. 2A depicts an example data processing flow that shows, in accordance with some embodiments, how the input data elements 244*a-i* may be processed through the system 200 by the transceiver device 212 and the execution of the instruction modules by the processing devices 214*a-n*, to produce the output data 244*m-q*.

FIG. 2B depicts an example data processing flow that shows, in accordance with some embodiments, how the output data 244*m-q* may be processed through the system 200 by the execution of the interaction pattern analysis module 242-4 by the processing devices 214*a-n*, to produce interaction pattern outputs (not explicitly shown) that are provided by the transceiver device 212 to one or more of the user message devices 202*a-m* and/or the user message devices 218*a-k*. Interaction pattern analysis module 242-4 may comprise statistical analysis software, such as SAS/STAT® by SAS Institute, Inc., Microsoft® Predictive Analytics™ by Microsoft, Inc., or the like.

In some embodiments for example, the output metrics 244*m-q* may be loaded into the interaction pattern analysis module 242-4 by one or more of the processing devices 214*a-n*. According to some embodiments, execution of the interaction pattern analysis module 242-4 (from and/or based on the output data/metrics 244*m-q*) may result in definition and/or calculation of one or more interaction management metrics, solutions, actions, and/or instructions. It may be determined based on stored rules defined by the interaction pattern analysis module 242-4, for example, that the definition of one or more interaction message types should be revised (e.g., based on values and/or calculations based on one or more of the output metrics 244*m-q*). It may be determined based on stored rules defined by the interaction pattern analysis module 242-4, for example, that the definition of one or more interaction patterns should be revised (e.g., based on values and/or calculations based on one or more of the output metrics 244-*q*). It may be determined based on stored rules defined by the interaction pattern analysis module 242-4, for example, that one or more recommended interaction outgoing messages should be added, changed, or removed from association with a stored definition of a particular interaction pattern. In some embodiments, such values, solutions, or decisions may be transmitted, via the transceiver device 212 and/or the networks 204*a-b* (such as in the form of one or more command signals and/or information packets) to one or more of the outside user message devices 202*a-m* and/or one or more of the inside user message devices 218*a-k*.

Some additional examples of interaction management using interaction pattern analysis are provided below. The examples are intended to be illustrative of one or more embodiments, but are not intended to be limiting.

According to a first example, a central interaction manager may be used to collect information from each message it processes. The data captured from these interaction messages may be indexed, tagged, or otherwise categorized or organized for reporting, querying, and/or statistical analysis purposes. Once indexed, data collected from many messages and interactions may be queried to help identify patterns of interaction, their associated transaction or business contexts, and associated interaction outcomes (e.g., favorable or unfavorable results of the interaction).

Analyzing interaction patterns (e.g., using interaction pattern analysis module 242-4) and how they correlate to specific end results allows for the definition of interaction patterns that have a relatively higher probability of producing favorable future interaction outcomes.

Interaction pattern analysis may be utilized to identify trends in particular business or transaction contexts. In one example, in an insurance context, analytics data may be utilized to answer questions, such as:

What is the probability a policy will be renewed and/or renewed with added coverage?

What is the probability that a policy will not be renewed and what early intervention is needed to drive this interaction to a favorable outcome (e.g., what type of particular interaction outgoing message is most likely to produce the desired result)?

What is the probability any specific claim will be resolved quickly and have a reasonable settlement cost?

What is the probability a claim will not be resolved within normal time frames and/or have an unreasonably high settlement and what early intervention (e.g., appropriate interaction outgoing message) is needed to drive this interaction to a more favorable outcome?

In another example, in a workplace context, analytics data may be utilized to answer questions, such as:

What is the probability an employee will successfully resolve any specific problem within a reasonable time?

What is the probability the time it will take an employee to resolve a specific problem will be unreasonable and what early intervention is needed to drive this interaction to a more favorable outcome?

As discussed with respect to various embodiments in this disclosure, identifying and capturing metadata related to an interaction may be useful in facilitating a successful interaction and/or providing an appropriate interaction outgoing message. Without understanding the context or transaction within which a given interaction is occurring, the opportunity to use these events to identify patterns of positive or negative interaction may be limited. In some embodiments, linking a user or employee identifier (e.g., a mobile phone number or email address) to an account or business entity allows the IM system to identify correlations between a given interaction type and the business context.

For example, an example insurance claim interaction might be interpreted as follows:

1) The date of loss on an insurance claim against a policy related to the customer's mobile phone number may be used to mark the start of a claim interaction pattern sequence.
2) The claim settlement or resolution date of the claim may mark the end of a claim interaction pattern sequence.
3) The settlement amount of the claim may be considered the primary outcome measurement of this interaction (e.g., the interaction pattern metric of interest for the particular interaction).
4) This type of claim and the settlement amounts of similar claims may be compared to understand if the outcome of this claim experience was positive or negative (e.g., to determine if the settlement amount for the particular claim is less than an average settlement amount for similar claims).
   a. A settlement significantly higher than similar claims might indicate a negative outcome.
   b. A settlement significantly lower than similar claims might indicate a positive outcome.

Virtually any interaction processed through the interaction management system may be analyzed in a similar manner to begin to identify patterns of interaction that produce negative or positive outcomes in any business context.

According to some embodiments, each interaction type may be defined with information useful for analysis. Some example attributes that define each interaction message type may include, without limitation:

1) Interaction ID—unique identifier
2) Interaction Name—a description to identify this interaction
3) Interaction Keywords—to facilitate natural language recognition
4) Interaction Component—the component (e.g., module or sub-module) that will carry out the action related to interaction
5) Interaction Sequence—the order in which this action should occur when more than one interaction is found for a given keyword combination.

According to some embodiments, interaction message data may comprise, for example, an identifier that identifies the originator or author of the message and/or the content or "body" of the interaction message.

As discussed with respect to various embodiments in this disclosure, interaction metadata and/or keywords may be determined and/or stored in associated with a particular interaction message. The interaction metadata and interaction keyword data associated with an interaction message may be referred to collectively in this disclosure as an "interaction log." In particular, an interaction log may be used to capture metadata associated with interaction messages processed by the interaction management system. Some example attributes that may be useful in defining records (e.g., for each individual interaction message) for an interaction log may include, without limitation:

1) Interaction ID—the unique identifier of the interaction being logged
2) Keywords—an array of keywords used to identify the type of the interaction message (e.g., "claim," "call," "5 pm," "tech support," "error")

3) Metadata—related business or transaction information (e.g., claim number: ABC123; policy number: 3466-WRFDSE1; account number: 1239876)
4) Timestamp—the date and time the log entry was written (e.g., when the interaction message was received and/or processed)
5) Interaction component—the currently configured interaction component invoked to handle the interaction message According to some embodiments, as interaction messages arrive, the interaction management system reviews each interaction message for keywords, which are compared to keywords linked to known interaction types (e.g., in the interaction message types data 244*d*). When a match is found in defined interaction message types, the related definition of the matching interaction message type is retrieved and, in some embodiments, an associated interaction component (e.g., defined for the message type) is invoked by passing (e.g., from the interaction message processing module) the interaction message data (e.g., the body of the message) and the identified keywords to the appropriate interaction component (e.g., as input parameters to an interaction component module). The interaction component may perform one or more of the following:

1) Use the originating identifier (e.g., phone number or email address) of the interaction message to query the related user transaction data (e.g., policy, claim, account, or employee business data);
2) Review the related user transaction data and extract key information from the related user transaction data for storage in an interaction log corresponding to the message; and/or
3) Invoke the corresponding interaction component associated with the interaction message type to perform the desired action requested by the originator.

As discussed above, because interactions are processed through the interaction management system, and corresponding log entries are stored, the interaction log data (e.g., for a plurality of interactions over time) may be used to identify interaction patterns that have a high probability of producing favorable vs. unfavorable outcomes.

In some embodiments, when processing an interaction message, if more than one interaction type is identified (e.g., for a given natural language keyword combination), the multiple returned actions can be invoked based on a defined interaction sequence order. This feature makes it possible to build complex interaction sequences in a modular manner to achieve more advanced interaction scenarios.

According to some embodiments, as discussed in this disclosure, as interaction messages are processed, control may be handed off to an appropriate interaction component, which may use an interaction event manager module to schedule itself to do the work the originator requested to be performed at a future date and time.

Figure 3:
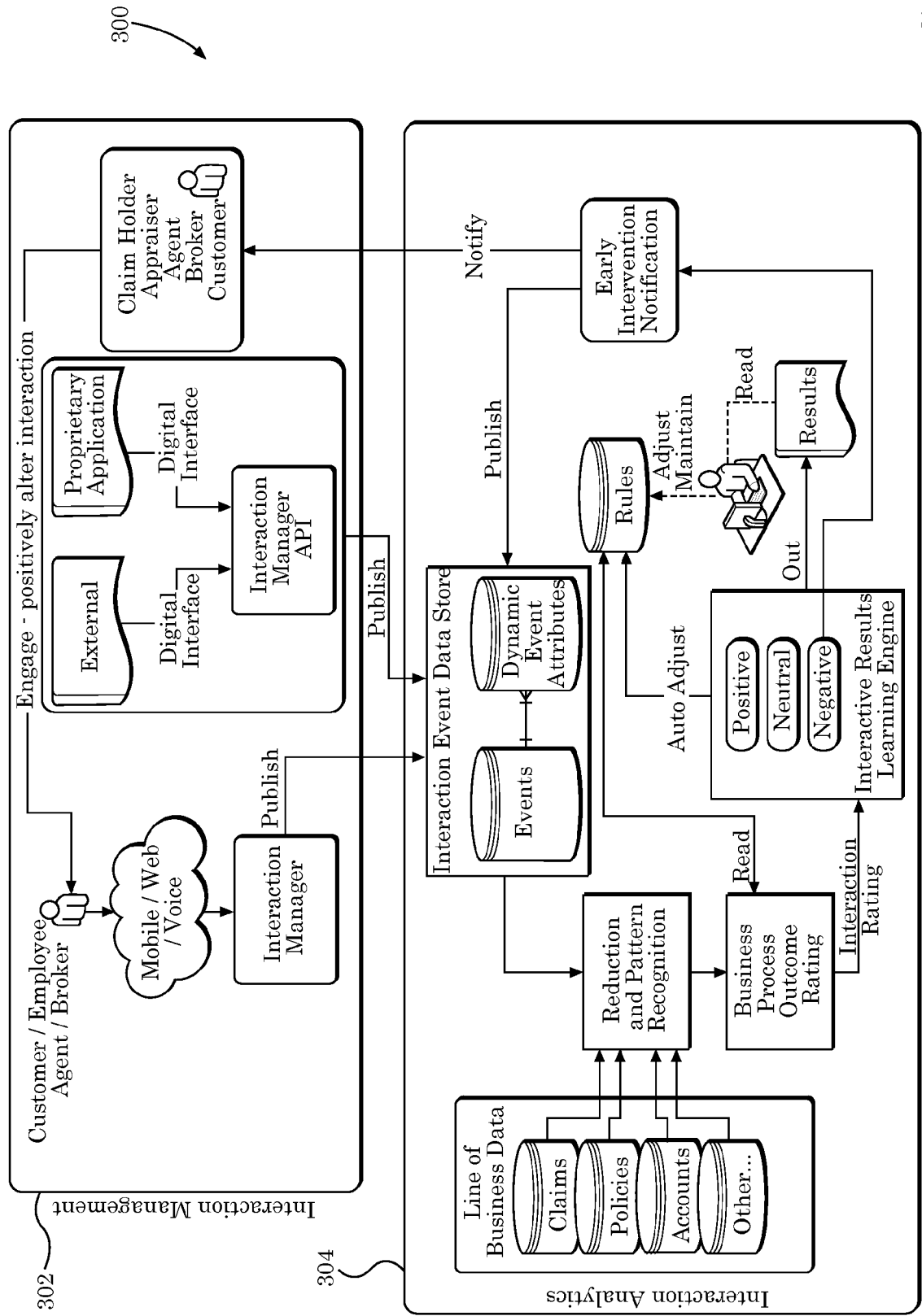
FIG. 3 is a block diagram of a system according to some embodiments.

Sample Interaction Types By Category
1) Convenience (insurance context)
   a. Find me an agent close by
   b. Request for Auto ID Card
   c. Tell my reports I'll be out for the day
   d. Am I covered for X?
   e. Reminders (doctor, house inspection, etc.)
2) Risk Mitigation
   a. Prevention and Planning
   b. Hurricanes
   c. Ice dams
   d. Earthquakes 3) Scheduling
   a. New premises review
   b. More employees review
   c. New technology review
   d. Cyber attack review
   e. Team Meeting
   f. Call Back
4) Sample Interaction Type Attributes captured
   a. Duration
   b. Geo-location
   c. Time of day
   d. Line Of Business
   e. Policy
   f. Type of Insurance
   g. Account Number
   h. Employee ID
   i. Employee responsibility code
   j. Key word array Referring now to FIG. 3, a block diagram of a system 300 (e.g., an interaction management system) according to some embodiments is shown. In some embodiments, the system 300 may comprise an interaction management platform 302 for processing interaction messages and managing interactions in a communications system, and an interaction analytics platform 304 for analyzing interactions, defining interaction patterns, identifying and scoring business process outcomes, and/or providing instructions to the interaction management platform 302 (e.g., for providing interaction outgoing messages and other communications to users). Some of the non-limiting examples provided in FIG. 3 are with respect to an insurance business context for illustrative purposes only.

As depicted in the example system 300, the interaction analytics platform 304 may comprise modules and systems for correlating sequences of events to identified business process types (e.g., utilizing various lines of business data), in order to recognize interaction patterns. Once a pattern is identified, a business process outcome rating is determined for that pattern. This interaction rating may then be reviewed (e.g., by an interaction results learning engine) in order to assess the way the pattern is used in the system, and corresponding rules for its use may be updated. If, for example, the interaction rating indicates the likelihood of a negative outcome, a notification or instruction may be transmitted to indicate the need for a specific interaction recommendation or intervention in the interaction (e.g., with a customer). The depicted rules database may comprise a dynamic rule set that governs the identification and rating of interaction sequence types in relation to business process outcome patterns. Historical data trends that significantly contradict established rule sets may be reviewed (e.g., manually or automatically) and adjusted as needed.

Figure 4:
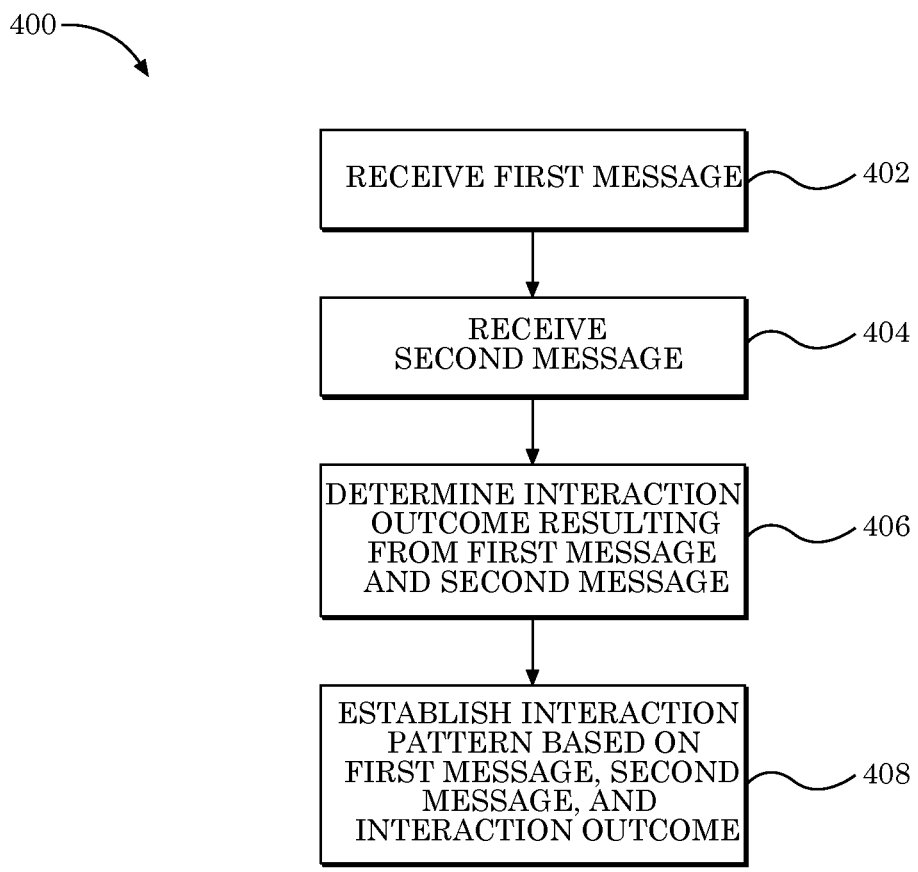
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized (e.g., specially-programmed as opposed to generally-programmed) and/or computerized processing devices (e.g., the processing devices 114*a-n*, 214*a-n*, of FIG. 1, FIG. 2A, and/or FIG. 2B herein), specialized computers, computer terminals, computer servers, computer systems and/or networks, and/or any combinations thereof (e.g., by one or more multi-threaded and/or multi-core processing units of an insurance company electronic message processing system). In some embodiments, the method 400 may be embodied in, facilitated by, and/or otherwise associated with various input mechanisms and/or interfaces.

The process and/or flow diagrams described herein do not necessarily imply a fixed order to any depicted actions, steps, and/or procedures, and embodiments may generally be performed in any order that is practicable unless otherwise and specifically noted. While generally not limiting with respect to order and/or timing, in some embodiments, the presented methods and processes may be specifically limited to and/or structured in accordance with any depicted and/or described order, hierarchy, timing, etc. Any of the processes and/or methods described herein may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described herein.

According to some embodiments, the processing of stored instructions in accordance with carrying out methods and/or procedures described herein may be accomplished via initiation of a plurality of data transfer transmissions and/or calls. A first step of a method may be carried out as a result of a first data transmission that enables (and/or a first call that initiates) a first data processing action via a first data processing thread and/or micro-engine, for example, while a second step of the same method may be carried out as a result of a second data transmission that enables (and/or a second call that initiates) a second data processing action via a second data processing thread and/or micro-engine. According to some embodiments, such multi-threaded data processing may (e.g., particularly in the case of synchronous, simultaneous, and/or parallel multi-threaded data processing) permit large numbers of data calculations to occur in a specialized manner (e.g., in accordance with specialized instructions, as described herein, as opposed to in accordance with a general purpose and/or commercially-available software program) in a short amount of time. In such a manner, for example, hundreds or thousands of data input elements may be processed to produce data processing outputs in as little as several minutes.

In some embodiments, the method 400 may comprise receiving (e.g., by a processing device and/or by a transceiver device and/or via an electronic communications network) a first message, at 402, and receiving a second message, at 404. The method 400 may further comprise determining an interaction outcome resulting from the first message and the second message, at 406. As discussed in this disclosure, an interaction outcome may be represented as a metric or value indicating a relative measure of the interaction outcome, as may be compared to the respective outcomes of other interactions. In one example, an interaction outcome may comprise a settlement amount in an insurance claim context.

The method 400 may comprise establishing an interaction pattern based on the first message, the second message, and the interaction outcome, at 408. In one example, an interaction pattern may be defined as the sequence of the first message and its corresponding type (e.g., a notice of loss message) and the second message, in association with the interaction outcome. Of course, as discussed in this disclosure, the interaction message may be based on more than two interactions and/or on more than two messages. For example, the interaction pattern may be defined by the interaction message types, in sequence, and the interaction outcome may comprise an average score calculated for a set of similar historical interaction patterns.

Figure 5:
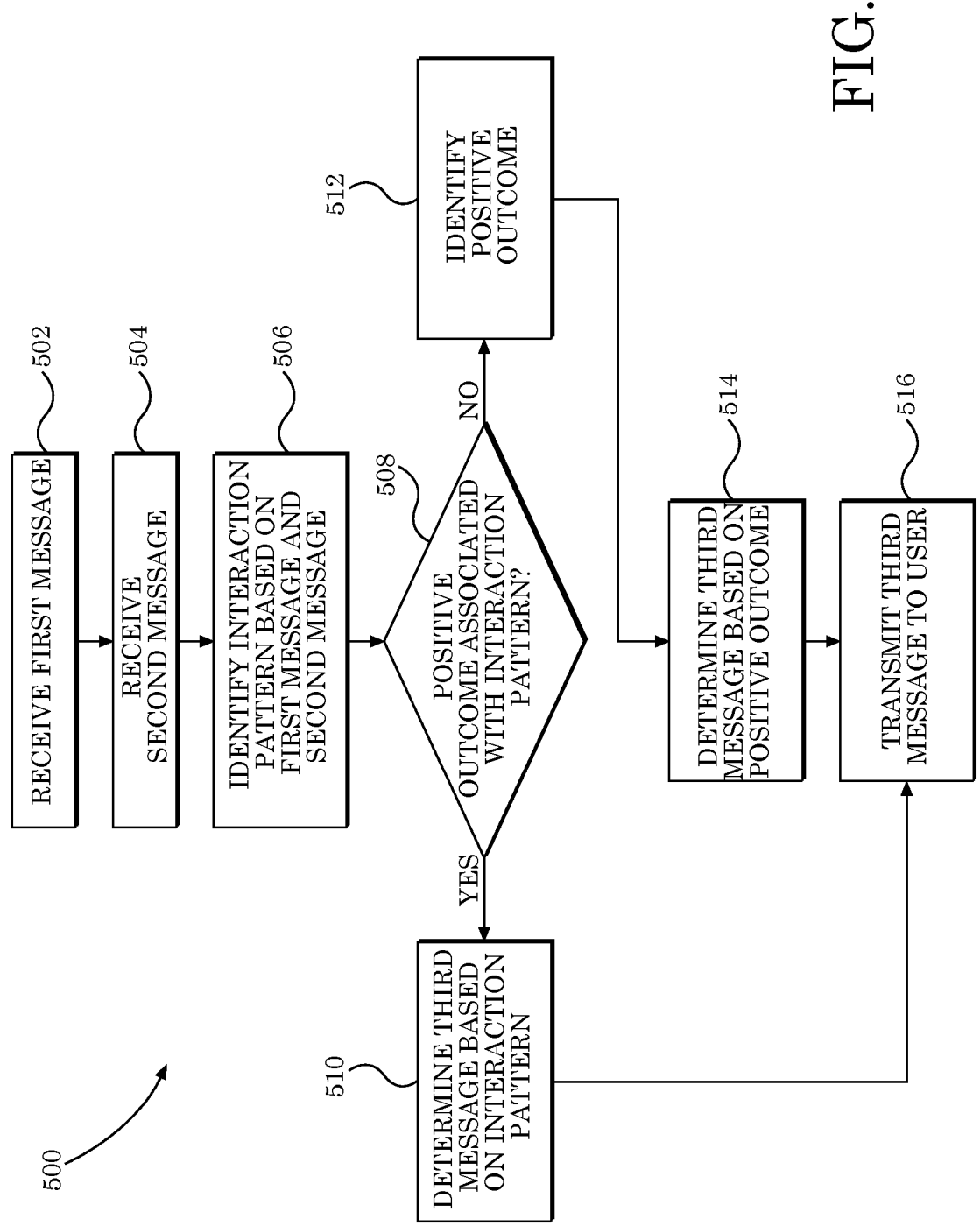
FIG. 5 is a flow diagram of a method according to some embodiments.

Referring now to FIG. 5, a flow diagram of a method 500 according to some embodiments is shown. In some embodiments, the method 500 may be performed and/or implemented by and/or otherwise associated with one or more specialized (e.g., specially-programmed as opposed to generally-programmed) and/or computerized processing devices (e.g., the processing devices 114a-n, 214a-n, of FIG. 1, FIG. 2A, and/or FIG. 2B herein), specialized computers, computer terminals, computer servers, computer systems and/or networks, and/or any combinations thereof (e.g., by one or more multi-threaded and/or multi-core processing units of an insurance company electronic message processing system). In some embodiments, the method 500 may be embodied in, facilitated by, and/or otherwise associated with various input mechanisms and/or interfaces.

In some embodiments, the method 500 may comprise receiving (e.g., by a processing device and/or by a transceiver device and/or via an electronic communications network) a first message, at 502; receiving a second message, at 504; and identifying an interaction pattern based on the first message and the second message, at 506. For example, an interaction analysis module may compare an interaction comprising a plurality of interaction messages to a database of interaction patterns, to identify a similar pattern. At 508 the method 500 may further comprise determining whether a positive outcome is associated with the identified interaction pattern (e.g., as stored in association with the pattern in a database). If a positive outcome is associated with the identified interaction pattern, then at 510 the method 500 may comprise determining a third message based on the identified interaction pattern (e.g., based on the definition of the pattern, the next preferred interaction in sequence may be identified). If not, then a positive outcome is determined, at 512. For example, a desired sale price or claim settlement amount may be identified (e.g., as a predetermined threshold amount). A third message may then be determined based on the positive outcome, at 514. In other words, an attempt may be made to "break" from the current pattern, by providing a message and/or message type that is more likely to produce the desired outcome. The method 500 may comprise at 516 transmitting the third message (determined from the pattern at 510 or determined at 514) to a user.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

Throughout the description herein and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

Some embodiments described herein are associated with a "module." As utilized herein, the term "module" may generally be descriptive of any combination of hardware, electronic circuitry and/or other electronics (such as logic chips, logical gates, and/or other electronic circuit elements or components), hardware (e.g., physical devices such as hard disks, solid-state memory devices, and/or computer components such as processing units or devices), firmware, and/or software or microcode.

Some embodiments described herein are associated with an "interaction." As utilized herein, the term "interaction" is generally descriptive of one or more messages transmitted between one message device or communication system to another message device or communication system. In one example, an interaction may consist of only a single email sent by a user to a company's technical support email address. In another example, an interaction may comprise two or more communications from one party to another, such as a sequence of emails sent between a customer and a technical support professional. In another example, an interaction may comprise all of the following: (i) a first email sent from a first user to a business's email address, which is received by an interaction management system for processing the first email by or on behalf of the business; (ii) a second email sent from the interaction management system to a second user (e.g., an employee of the business having expertise in the subject referenced in the first email) based on processing of the first email, (iii) a second email from the first user to the business's email address, for instance, requesting a response to the first email or providing additional information, and (iv) a text message sent from the second user to the first user (e.g., answering the first user's inquiry). Accordingly, in the preceding example, the "interaction" describes the communication steps between and among the two users and the interaction management system.

As utilized herein, the term "interaction message" is generally descriptive of a communication (e.g., an electronic message) sent from one message device or communication system to another message device or communication system. Many of the embodiments described in this disclosure may be directed to electronic interaction messages, but in some embodiments an interaction message may comprise a non-electronic message sent to a user, for example, via postal mail.

An interaction may be described in this disclosure as having one or more of: (i) an "interaction sequence" or "order" to a plurality of such messages, and (ii) an "interaction outcome" or "result" of the interaction. Interaction sequences and interaction outcomes may be useful, in accordance with some embodiments, for identifying and/or creating one or more interaction patterns or models.

Some embodiments described in this disclosure are associated with an "interaction pattern" or "interaction model." As used in this disclosure, "interaction pattern" and "interaction model" are used synonymously and define an actual, composite, or generated definition of a particular interaction (e.g., one or more electronic interaction messages). An interaction pattern may be defined, for example, using one, some, or all of the following types of information: (i) one or more interaction messages, (ii) a respective interaction message type for each interaction message defined for the interaction pattern, (iii) sequence information defining an order of the interaction messages in the defined interaction pattern, (iv) information associated with a transaction corresponding to the defined interaction pattern (e.g., a proposed business transaction; the subject matter of a customer's request to a business), (v) an interaction pattern outcome describing a predicted and/or desirable outcome of the modeled interaction; and/or (vi) an interaction pattern metric (e.g., a score, rating, or other type of relative measure) useful for comparing one interaction pattern to another, and/or for comparing to a similar metric derived for a "real" interaction (e.g., to determine if a particular interaction pattern is representative of a current or historical interaction).

Some embodiments described in this disclosure are described as being associated with a "transaction" or a "user transaction." As used in this disclosure, "transaction" and "user transaction" are used to describe generally any contextual information relevant to one or more interactions. (Such contextual transaction information may also be referred to in this disclosure as "metadata" for an interaction or interaction message.) In one example, an interaction may include communications about a negotiation in the context of a sales or lease transaction. In another example, a transaction may refer to the purpose of a user's interaction, such as to acquire customer support, or to make a request to renew a subscription or insurance policy, and the associated transaction data may include, for example, a user's account number. Accordingly, transaction information may include additional contextual information about an account, purchase, agreement, inquiry, etc., that is associated with an interaction. In one example, transaction information relevant to an interaction involving communication about an insurance policy claim or policy renewal may include information about an insurance policy (e.g., a policy number), an insurance claim (e.g., an insurance claim number), a premium amount, and/or a claim settlement amount.

Some embodiments described herein are associated with a "user device," a "remote device," or a "network device." As used herein, each of a "user device" and a "remote device" is a subset of a "network device." The "network device," for example, may generally refer to any device that can communicate via a network, while the "user device" may comprise a network device that is owned and/or operated by or otherwise associated with a particular user (and/or group of users—e.g., via shared login credentials and/or usage rights). A "remote device" may generally comprise, for example, a device remote from a primary device or system component and/or may comprise a wireless and/or portable network device. Examples of user, remote, and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. User, remote, message, and/or network devices may, in some embodiments, comprise one or more network components.

As used herein, the term "network component" may refer to a user, remote, or network device, or a component, piece, portion, or combination of user, remote, or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication," as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination In some embodiments, one or more specialized machines, such as a computerized processing device, a server, a remote terminal, and/or a customer device may implement the various practices described herein. A computer system of an insurance claim processing enterprise may, for example, comprise various specialized computers that interact to analyze, process, and/or transform data as described herein The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant reserves the right to file additional applications to pursue patents for subject matter that has been disclosed and enabled, but not claimed in the present application.

What is claimed is:

1. An electronic message processing system utilizing an interaction pattern analysis module, comprising:
   a plurality of electronic processing devices;
   an electronic communications network transceiver device in communication with the plurality of electronic processing devices; and
   a memory device in communication with the plurality of electronic processing devices, the memory device storing instructions configured in a set of programmatically distinct modules, the modules comprising (i) an interaction message processing module, (ii) an interaction message type analysis module, (iii) an interaction component module, and (iv) an interaction analysis module, and wherein the modules, when executed by the plurality of electronic processing devices, direct the plurality of electronic processing devices to:
      receive as input, into the interaction message processing module and from a plurality of remote user devices, each of the plurality of remote user devices being associated with a specific user, data indicative of at least one electronic message received from each of the specific users;
      receive as input, into the interaction message type analysis module and from the interaction message processing module, at least a portion of each at least one electronic message;
      determine, by the interaction message type analysis module and based on the at least a portion of each at least one electronic message, an interaction type associated with each at least one electronic message;
      receive as input, into the interaction analysis module, data indicative of at least one rule for recognizing an interaction pattern in a plurality of interaction events;
      receive as input, into the interaction analysis module, data indicative of a plurality of interaction events associated with a specific user, the plurality of interaction events comprising at least one electronic message from the specific user;
      determine, by the interaction analysis module and based on (i) the data indicative of the plurality of interaction events associated with the specific user and (ii) the respective interaction type associated with each at least one electronic message of the plurality of interaction events, at least one interaction outgoing message to transmit to the specific user; and output, by the interaction message processing module via the electronic communications network transceiver device, the at least one interaction outgoing message to the specific user.

2. The electronic message processing system of claim 1, wherein the modules, when executed by the plurality of electronic processing devices, further direct the plurality of electronic processing devices to:
determine, by the interaction analysis module and based on the data indicative of the plurality of interaction events associated with the specific user, an interaction pattern metric for the plurality of interaction events associated with the specific user.

3. The electronic message processing system of claim 1, wherein the modules, when executed by the plurality of electronic processing devices, further direct the plurality of electronic processing devices to:
determine, by the interaction analysis module and based on the data indicative of the plurality of interaction events associated with the specific user, an interaction pattern metric indicative of a predicted result of a business transaction with the specific user.

4. The electronic message processing system of claim 1, wherein the modules, when executed by the plurality of electronic processing devices, further direct the plurality of electronic processing devices to:
determine, by the interaction analysis module and based on the data indicative of the plurality of interaction events associated with the specific user, an interaction pattern metric indicative of a predicted result of an insurance claim settlement for the specific user.

5. The electronic message processing system of claim 1, wherein the modules, when executed by the plurality of electronic processing devices, further direct the plurality of electronic processing devices to:
receive as input into the interaction analysis module from a database of interaction patterns data, data indicative of at least one rule for recognizing an interaction pattern in a plurality of interaction events; and
calculate, by the interaction analysis module and based on:
  (i) the data indicative of the plurality of interaction events associated with the specific user,
  (ii) the respective interaction type associated with each at least one electronic message of the plurality of interaction events, and
  (iii) data indicative of at least one rule for recognizing an interaction pattern in a plurality of interaction events,
an interaction pattern metric for the plurality of interaction events for the specific user.

6. The electronic message processing system of claim 1, wherein the modules, when executed by the plurality of electronic processing devices, further direct the plurality of electronic processing devices to:
determine, by the interaction analysis module, that the plurality of interaction events indicate a potential negative interaction outcome with the specific user.

7. The electronic message processing system of claim 1, wherein the modules, when executed by the plurality of electronic processing devices, further direct the plurality of electronic processing devices to:
determine, by the interaction analysis module, that the plurality of interaction events indicate a potential positive interaction outcome with the specific user.

8. The electronic message processing system of claim 1, wherein the modules, when executed by the plurality of electronic processing devices, further direct the plurality of electronic processing devices to:
identify, by the interaction analysis module, an interaction outgoing message associated with a pattern of interaction events having a potential positive outcome for the specific user; and
transmit, by the interaction analysis module to a remote user device associated with the specific user, data indicative of the identified interaction outgoing message.

9. The electronic message processing system of claim 1, wherein the at least one electronic message comprises one or more of the following types of electronic messages:
a voice message,
a short message service (SMS) message,
a multimedia message service (MMS) message,
a message received via a browser application,
a message received from a mobile device,
a message received via Internet from a user device,
an email message, and
an instant message (IM).

10. The electronic message processing system of claim 1, wherein the modules, when executed by the plurality of electronic processing devices, further direct the plurality of electronic processing devices to:
determine, via an interaction component module and based on a respective interaction type associated with an electronic message of the plurality of interaction events, at least one future interaction event to schedule; and
transmit, by the interaction component module, an indication of the at least one future interaction event to an interaction event scheduler.

11. The electronic message processing system of claim 1, wherein the modules, when executed by the plurality of electronic processing devices to determine the interaction type associated with each at least one electronic message comprise, direct the plurality of electronic processing devices to:
identify, by the interaction message type analysis module using a natural language processor module, at least one keyword in an electronic message, the keyword corresponding to a definition of an interaction message type stored in a database of interaction message types.

12. The electronic message processing system of claim 1, wherein the modules, when executed by the plurality of electronic processing devices, further direct the plurality of electronic processing devices to:
access, by an interaction component module, a database storing user transaction data associated with the specific user; and
store, by the interaction component module in a database of historic interactions data, at least a portion of the user transaction data in association with the at least a portion of each at least one electronic message.

* * * * *